(No Model.)

J. W. JOHNSON.
MEAT HOOK.

No. 386,749. Patented July 24, 1888.

WITNESSES.
F. L. Durand
R. W. Elliott

INVENTOR.
Joseph W. Johnson
By Louis Bagger & Co.
Attorneys.

N. PETERS, Photo-Lithographer, Washington, D. C.

000# UNITED STATES PATENT OFFICE.

JOSEPH W. JOHNSON, OF PHILADELPHIA, PENNSYLVANIA, ASSIGNOR TO THOMAS DEVLIN & CO., OF SAME PLACE.

MEAT-HOOK.

SPECIFICATION forming part of Letters Patent No. 386,749, dated July 24, 1888.

Application filed April 19, 1888. Serial No. 271,205. (No model.)

*To all whom it may concern:*

Be it known that I, JOSEPH W. JOHNSON, a citizen of the United States, and a resident of Philadelphia, in the county of Philadelphia and State of Pennsylvania, have invented certain new and useful Improvements in Meat-Hooks; and I do hereby declare that the following is a full, clear, and exact description of the invention, which will enable others skilled in the art to which it appertains to make and use the same.

Figure 1:
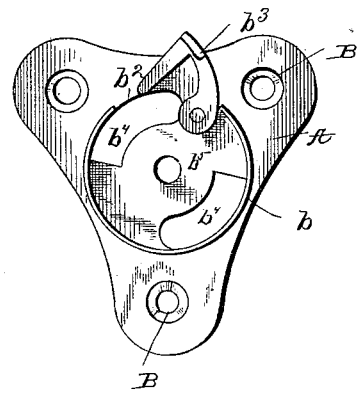
Figure 2:
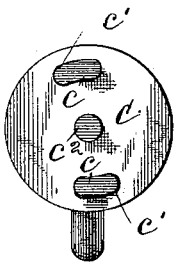
Figure 4:
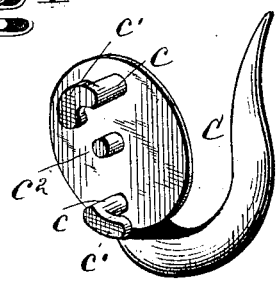
Figure 3:
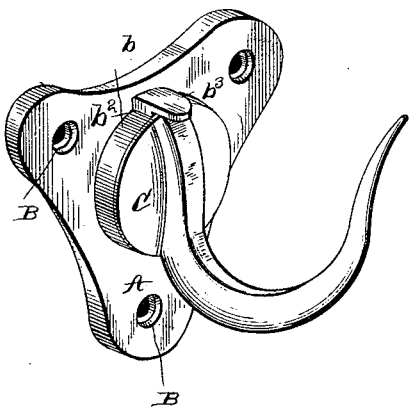

Figure 1 is a front elevation of the base of the hook, showing a circular flange thereon, on which the plate of the hook rests. Fig. 2 is an end view of the hook, showing the lugs or projections thereon for engaging suitable openings in the base to hold the same in position. Fig. 3 is a perspective view of the device intact; and Fig. 4 is a rear perspective view of the hook detached.

This invention has relation to meat-hooks, and has for its object to produce a simple and effective hook, which shall be of such construction that it may readily be removed from the base on which it is secured when desired or necessary.

Referring to the drawings, A designates the base to which the hook is secured. This may be made of any suitable material, but preferably of iron galvanized, and is provided with suitable openings, B, through which the screws pass for holding it to the wall or other support. On the face of this base is formed an outward-extending circular flange, $b$, which is designed as a support for the plate C, to which the hook is secured. A portion of this flange is cut away, as shown at $b^2$, in order to allow a catch, $b^3$, to move therein in order to lock the hook in place on the base. The base is also provided with two semicircular apertures, $b^4$, just within the flange $b$, and also with a central aperture, $b^5$.

The plate C of the hook is provided with two lugs, $c$, each of which has a toe, $c'$, which extend in opposite directions, and a center lug, $c^2$, designed to act as a pivot on which the hook turns when placed on the base.

When the hook is placed in position, it is turned to one side in order to allow the lugs $c$ to enter the openings in the base, and is then turned to a vertical position, which causes the toes of the lugs to engage with the rear of the base and prevent the hook from being removed or pulled off the base, and the catch is then dropped in place behind the upper lug $c$, which locks the hook in place against movement.

Should it be necessary at any time to remove the hook—as, for example, when it is necessary to lift a large and heavy piece of meat from the hook—it will only be found necessary to lift the catch, turn the hook to one side, and withdraw it from the base. It will be seen readily that the advantage of the flange $b$ is very great. In adjustable hooks as ordinarily constructed the plate on which the hook is secured binds against the base. It frequently happens that rust forms between the two, and thus would prevent the removal of the hook unless some force is brought to bear upon it; but by my construction it will be seen that no rust can accumulate between the hook and the base, as the plate to which the hook is secured only bears against the raised flange. Furthermore, this construction admits of the toes on the lugs passing under the base, thereby giving additional strength to the hook.

Having thus fully described my invention, what I claim as new, and desire to secure by Letters Patent, is—

In a meat-hook, the combination, with a base-piece having an outward flange, a portion of which is cut away, said base being further provided with openings just within the flange, and a central aperture, of the supporting-hook, the plate of which is provided with two lugs, each of which is provided with a toe, and a central lug, and a locking-hook pivotally secured to the base-piece at the cut-away portion of the flange, the free end of which engages with one of the toed lugs of the plate of the supporting-hook when in position.

In testimony that I claim the foregoing as my own I have hereunto affixed my signature in presence of two witnesses.

JOSEPH W. JOHNSON.

Witnesses:
  WM. H. KENNEDY,
  GEORGE THOMAS.